US009320970B2

(12) United States Patent
Boyd et al.

(10) Patent No.: US 9,320,970 B2
(45) Date of Patent: Apr. 26, 2016

(54) SYSTEM CONTROLLED PLAYER-RELATED BONUSES IN GAMING MACHINES

(71) Applicant: IGT, Reno, NV (US)

(72) Inventors: Scott A. Boyd, Las Vegas, NV (US); Richard Jeffrey Jordan, Las Vegas, NV (US); Miles M. Patceg, Las Vegas, NV (US)

(73) Assignee: IGT, Reno, NV (US)

( * ) Notice: Subject to any disclaimer, the term of this patent is extended or adjusted under 35 U.S.C. 154(b) by 414 days.

(21) Appl. No.: 13/777,786

(22) Filed: Feb. 26, 2013

(65) Prior Publication Data

US 2013/0172078 A1 Jul. 4, 2013

Related U.S. Application Data

(63) Continuation of application No. 10/663,379, filed on Sep. 15, 2003, now Pat. No. 8,403,745.

(60) Provisional application No. 60/411,273, filed on Sep. 16, 2002.

(51) Int. Cl.
*G06F 17/00* (2006.01)
*A63F 13/30* (2014.01)
*G07F 17/32* (2006.01)

(52) U.S. Cl.
CPC ................ *A63F 13/12* (2013.01); *G07F 17/32* (2013.01); *G07F 17/3244* (2013.01); *G07F 17/3258* (2013.01)

(58) Field of Classification Search
None
See application file for complete search history.

(56) References Cited

U.S. PATENT DOCUMENTS 5,655,961 A 8/1997 Acres et al.
5,752,882 A * 5/1998 Acres et al. .................... 463/42
5,833,540 A 11/1998 Miodunski et al.
6,162,121 A 12/2000 Morro et al.
6,168,520 B1 1/2001 Baerlocher et al.
6,231,445 B1 5/2001 Acres
6,254,483 B1 7/2001 Acres
6,257,981 B1 7/2001 Acres et al.
6,309,300 B1 10/2001 Glavich
6,315,666 B1 * 11/2001 Mastera et al. ................ 463/31
6,334,814 B1 1/2002 Adams
6,347,996 B1 2/2002 Gilmore et al.
6,358,149 B1 3/2002 Schneider et al.

(Continued)

FOREIGN PATENT DOCUMENTS

GB 2389800 A 12/2003
WO 0199067 A3 12/2001

*Primary Examiner* — Paul A D'Agostino
(74) *Attorney, Agent, or Firm* — Griffiths & Seaton PLLC

(57) ABSTRACT

The present invention integrates the concepts of interactive player based promotions, games, and bonusing that utilize a touch screen display on a gaming system associated with a remote player tracking system. The promotions are configured at a remote configuration workstation by selecting system criteria defining the particular bonus promotion to thereby create a "bonus rule". Promotions have four primary criteria. The first is the "Trigger" which is the criterion that determines when the bonus screen is activated to display a promotion. The second is the "Interface" that determines what will be displayed on the bonus screen. The third is the "Award" in which the nature of the bonus payment, including the method of choosing the value to award and the required player interaction to receive the promotion, is determined. And finally, the "Currency" system determines the method of payment to the player for earning or receiving the promotion.

20 Claims, 12 Drawing Sheets

(56) References Cited

U.S. PATENT DOCUMENTS

| | | | | |
|---|---|---|---|---|
| 6,361,441 | B1 | 3/2002 | Walker et al. | |
| 6,375,567 | B1 * | 4/2002 | Acres | 463/25 |
| 6,503,146 | B2 | 1/2003 | Walker et al. | |
| 6,506,118 | B1 | 1/2003 | Baerlocher et al. | |
| 6,575,832 | B1 * | 6/2003 | Manfredi et al. | 463/25 |
| 6,669,559 | B1 | 12/2003 | Baerlocher et al. | |
| 6,736,725 | B2 | 5/2004 | Burns et al. | |
| 6,769,986 | B2 | 8/2004 | Vancura | |
| 6,884,173 | B2 * | 4/2005 | Gauselmann | 463/42 |
| 6,884,174 | B2 | 4/2005 | Lundy et al. | |
| 6,939,234 | B2 | 9/2005 | Beatty | |
| 6,955,600 | B2 | 10/2005 | Glavich et al. | |
| 7,033,276 | B2 | 4/2006 | Walker et al. | |
| 2001/0009865 | A1 * | 7/2001 | Demar et al. | 463/20 |
| 2001/0034643 | A1 | 10/2001 | Acres | |
| 2002/0013173 | A1 * | 1/2002 | Walker et al. | 463/40 |
| 2002/0039918 | A1 * | 4/2002 | Anderson et al. | 463/16 |
| 2002/0039923 | A1 * | 4/2002 | Cannon et al. | 463/42 |
| 2002/0107065 | A1 * | 8/2002 | Rowe | 463/20 |
| 2002/0147047 | A1 * | 10/2002 | Letovsky et al. | 463/42 |
| 2002/0183105 | A1 * | 12/2002 | Cannon et al. | 463/16 |
| 2003/0003988 | A1 * | 1/2003 | Walker et al. | 463/21 |
| 2003/0060256 | A1 * | 3/2003 | Joshi | 463/16 |
| 2003/0119573 | A1 * | 6/2003 | McClintic | 463/16 |
| 2003/0119581 | A1 * | 6/2003 | Cannon et al. | 463/25 |
| 2003/0125103 | A1 * | 7/2003 | Tessmer et al. | 463/20 |
| 2003/0176216 | A1 | 9/2003 | Storey | |
| 2003/0176219 | A1 * | 9/2003 | Manfredi et al. | 463/25 |
| 2004/0023709 | A1 * | 2/2004 | Beaulieu et al. | 463/16 |
| 2004/0038735 | A1 * | 2/2004 | Steil et al. | 463/27 |
| 2004/0077408 | A1 * | 4/2004 | D'Amico et al. | 463/42 |
| 2005/0282638 | A1 * | 12/2005 | Rowe | 463/42 |
| 2007/0032288 | A1 * | 2/2007 | Nelson et al. | 463/16 |

* cited by examiner

RULE CREATOR

APPLY TO:
- ☐ All machines
- ☐ Machine group 1
- ☐ Machine group 2
- ☐ Machine group 3
- ☐ Machine group 4

TRIGGER
- ☐ Specific Game Outcomes
- ☐ Series of Game Outcomes
- ☐ Sets of Game Outcomes
- ☐ Consecutive Game Outcomes
- ☐ X outcomes in N tries
- ☐ Outcome sets/unit time
- ☐ Outcomes relative to others
- ☐ Points Earned
- ☐ Win/Loss Per Unit of Time
- ☐ Visitation Frequency
- ☐ Handle Per Unit of Time
- ☐ Continuous Play
- ☐ Specific Player Demographics
- ☐ Sets of Player Demographics
- ☐ Series of Player Demographics
- ☐ Lucky Coin
- ☐ Lucky Time
- ☐ Lucky Game
- ☐ Electronic Drawing

INTERFACE
- ☐ Animation
- ☐ Multi Animations
- ☐ Start Touch
- ☐ Stop Touch
- ☐ Sum of Items
- ☐ Combination Pay table
- ☐ Pick x of n
- ☐ Pick x of n until stop
- ☐ Match x of n
- ☐ Match x of n, faster
- ☐ Take Offer, x of n
- ☐ Pick x of n, with redraw
- ☐ Time Element
- ☐ Reveal drawing tile by tile
- ☐ Pick a later possible prize

AWARD
- ☐ Win Item
- ☐ Script Method

CURRENCY
- ☐ Complementary Goods/Services
- ☐ Cash Back
- ☐ Points
- ☐ Extra Credit®
- ☐ Promotional Credits
- ☐ Discount Coupons

FIG. 15

RULE CREATOR

APPLY TO:

- ☒ All machines
- ☐ Machine group 1
- ☐ Machine group 2
- ☐ Machine group 3
- ☐ Machine group 4

TRIGGER

- ☒ Specific Game Outcomes
- ☐ Series of Game Outcomes
- ☐ Sets of Game Outcomes
- ☐ Consecutive Game Outcomes
- ☐ X outcomes in N tries
- ☐ Outcome sets/unit time
- ☐ Outcomes relative to others
- ☐ Points Earned
- ☐ Win/Loss Per Unit of Time
- ☐ Visitation Frequency
- ☐ Handle Per Unit of Time
- ☐ Continuous Play
- ☐ Specific Player Demographics
- ☐ Sets of Player Demographics
- ☐ Series of Player Demographics
- ☐ Lucky Coin
- ☐ Lucky Time
- ☐ Lucky Game
- ☐ Electronic Drawing

INTERFACE

- ☐ Animation
- ☐ Multi Animations
- ☒ Start Touch
- ☒ Stop Touch
- ☐ Sum of Items
- ☐ Combination Pay table
- ☐ Pick x of n
- ☐ Pick x of n until stop
- ☐ Match x of n
- ☐ Match x of n, faster
- ☐ Take Offer, x of n
- ☐ Pick x of n, with redraw
- ☐ Time Element
- ☐ Reveal drawing tile by tile
- ☐ Pick a later possible prize

AWARD

- ☒ Win Item
- ☐ Script Method

CURRENCY

- ☐ Complementary Goods/Services
- ☐ Cash Back
- ☐ Points
- ☒ Extra Credit®
- ☐ Promotional Credits
- ☐ Discount Coupons

FIG. 18

SYSTEM CONTROLLED PLAYER-RELATED BONUSES IN GAMING MACHINES

CROSS-REFERENCE TO RELATED APPLICATIONS

This application is a Continuation application of U.S. application Ser. No. 10/663,379, filed on 15 Sep. 2003, which claims the benefit of U.S. Provisional Patent Application No. 60/411,273 filed 16 Sep. 2002, and which applications are incorporated herein by reference. A claim of priority to all, to the extent appropriate, is made.

BACKGROUND OF THE INVENTION

1. Field of the Invention

This invention relates generally to electronic gaming machines and more particularly to a method and apparatus for integrating secondary bonusing schemes within primary gaming machines coupled to an external control system.

2. Description of the Prior Art

Casinos typically include electronic gaming machines (EGMs) such as slot machines and video poker machines. Slot machines, for example, usually include three reels that each have a plurality of symbols printed thereon. After the player applies a wager to the machine, he or she starts play by triggering a switch that starts the reels spinning. Each reel stops at a random position and thereby presents three symbols—one from each reel. Some combinations of symbols do not pay any jackpot. Others pay varying amounts according to predetermined combinations that appear in a pay table displayed on the machine and stored in the gaming machine's programmable read-on memory (PROM).

Competition for players among electronic gaming machines is tight and the industry is developing different methods for attracting and keeping players at their machines. Current slot machines have been known to incorporate a second video screen controlled by the machine itself to display bonus sequences. U.S. Pat. Nos. 6,319,125 (the '125 patent) and 5,655,961 (the '961 patent), owned in common with the present application and specifically incorporated herein by reference, disclose complex examples of bonusing implemented over a network. However, the need exists for centrally configurable bonusing that can be tailored to the specific player rather than generic schemes controlled only by the slot machine electronics.

SUMMARY OF THE INVENTION

The present invention integrates the concepts of interactive player based promotions, games, and bonusing that utilize a touch screen display on a gaming system associated with a remote player tracking system. The promotions are configured at a remote configuration workstation by selecting system criteria defining the particular bonus promotion. Promotions have four primary systems. The first is the "Trigger" which is the criterion that determines when the bonus screen is activated to display a promotion. The second is the "Interface" that determines what will be displayed on the bonus screen. The third is the "Award" in which the nature of the bonus payment, including the method of choosing the value to award and the required player interaction to receive the promotion, is determined. And finally, the "Currency" system determines the method of payment to the player for earning or receiving the promotion.

These criteria would allow casinos to customize second screen bonuses to their particular casino. This would lead to additional loyalty and also allow casinos the ability to apply the power of bonusing to the second screen bonus. For example, the type of second screen and the amount of the second screen prize could be determined by player group.

This document will further define each of those four concepts and will associate several promotional examples that clarify the linkage between the four concepts listed above. In all cases these examples can print a ticket as receipt or acknowledgement to the customer of their participation and their award from a promotion, game or bonus. This ticket can be printed from a printer controlled by the machine, shared controlled printer between the game and the system, or a printer completely controlled by the system.

The foregoing and other objects, features and advantages of the invention will become more readily apparent from the following detailed description of a preferred embodiment of the invention that proceeds with reference to the accompanying drawings.

BRIEF DESCRIPTION OF THE DRAWINGS

FIGS. 15-18 are tables illustrating the selectable criteria used to form bonus promotion rules.

DETAILED DESCRIPTION

Figure 1:
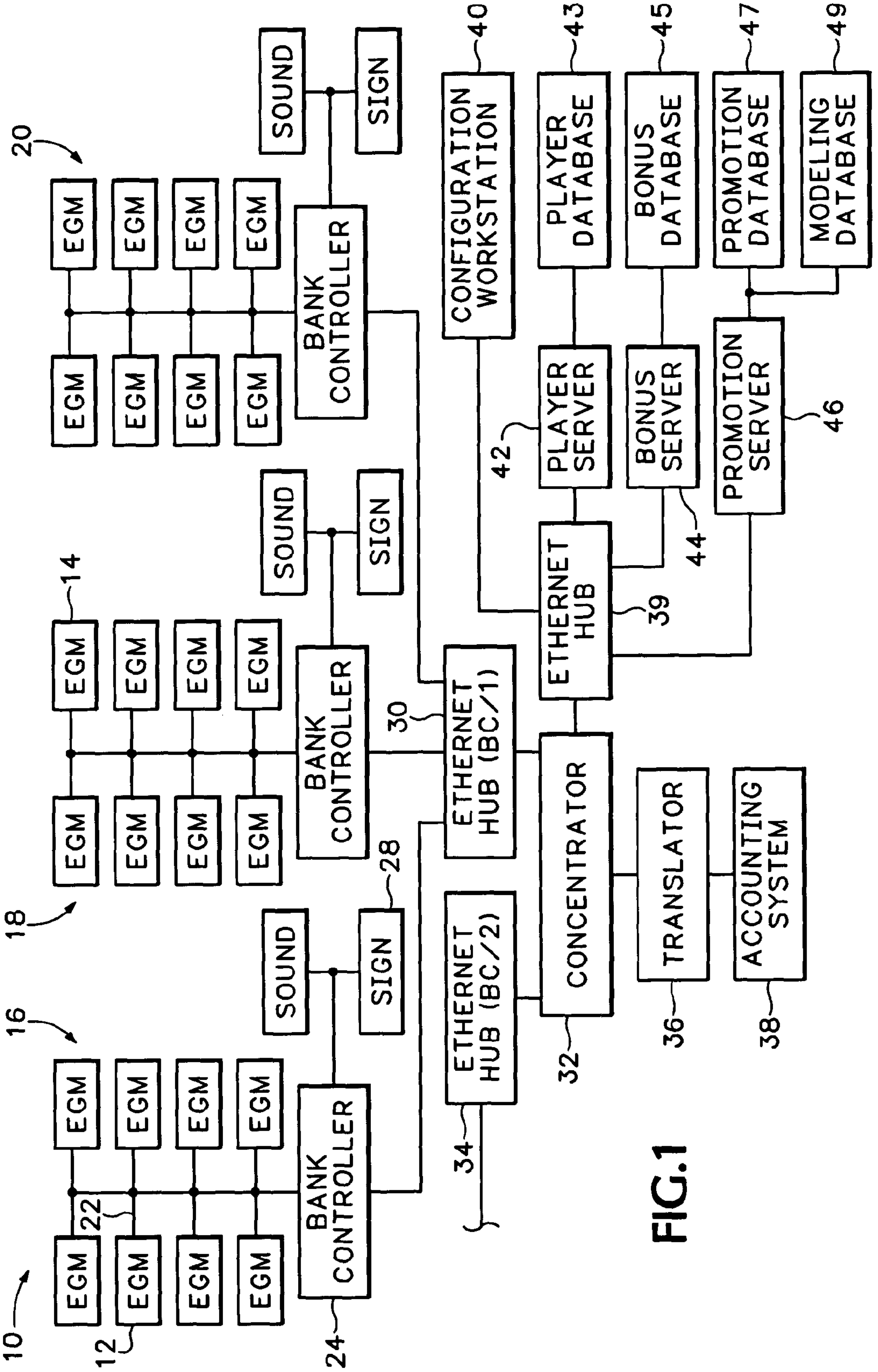
FIG. 1 is a schematic diagram of a plurality of electronic gaming machines interconnected by a computer network to a host computer in accordance with a networked embodiment of the present invention.

Turning now to FIG. 1, indicated generally at 10 is a schematic diagram illustrating electronic gaming machines (EGMs), like EGMs 12, 14, interconnected by a computer network. Included therein are three banks, indicated generally at 16, 18, 20, of EGMs. Each EGM is connected via a network connection, like connection 22, to a bank controller 24. In the present embodiment of the invention, each bank controller comprises a processor that facilitates data communication between the EGMs in its associated bank and the other components on the network. The bank controller may also include a CD ROM drive for transmitting digitized sound effects, such as music and the like, to a speaker 26 responsive to commands issued over the network to bank controller 24. The bank controller may also be connected to an electronic sign 28 that displays information, such as jackpot amounts and the like, visible to players of machines on bank 16. Such displays are generated and changed responsive to commands issued over the network to bank controller 24. Each of the other banks 18, 20 of EGMs include associated bank controllers, speakers, and signs as shown, which operate in substantially the same manner.

Ethernet hub 30 connects each of the bank controllers associated with banks 16, 18, 20 of EGMs to a concentrator 32. Another Ethernet hub 34 connects similar bank controllers (not shown), each associated with an additional bank of EGMs (also not shown), to concentrator 32. The concentrator functions as a data control switch to route data from each of the banks to a translator 36. The translator comprises a compatibility buffer between the concentrator and a proprietary accounting system 38. It functions to place all the data gathered from each of the bank controllers into a format compatible with accounting system 38. The present embodiment of the invention, translator 38 comprises an Intel Pentium 200 MHz Processor operating Microsoft Windows NT 4.0.

Another Ethernet hub 39 is connected to a configuration workstation 40, a player server 42, a bonus server 44 and a promotion server 46. Hub 39 facilitates data flow to or from the configuration workstation 40 and the servers 42, 44, and 46. Additionally, the servers 42, 44, and 46 communicate through the concentrator 32 to the bank controllers 24, which, in turn, communicate with the particular gaming devices 12.

The configuration workstation 40 has a user interface that allows portions of the network 10 and the servers 42, 44, and 46 to be set up and modified. The configuration workstation 40 could include a personal computer having a keyboard, monitor, microprocessor, memory, an operating system, and a network card coupled to the Ethernet hub 30.

The player server 42 includes a microcomputer that is used to track data of players using the gaming devices 12. The player server 42 is coupled to a player database 43 where the player tracking data is stored. Another function of the player server 42 is to control messages that appear on display 58 associated with each gaming device 12 and the messages on the signs 28 coupled to the bank server 24. The player server 42 may be embodied in a microcomputer including, for instance an Intel Pentium Processor, Microsoft operating system and a network card to couple the server to the Ethernet hub 39.

The bonus server 44 is embodied by a microcomputer and is used to control bonus applications or bonus systems on the gaming network 10. The bonus server 44 is coupled to a database 45 where bonus data is stored. The bonus server 44 implements includes a set of rules for awarding jackpots in excess of those established by the winning pay tables of each gaming device 12. Some bonus awards may be made randomly, while others may be made to link to groups of gaming devices 12 operating in a progressive jackpot mode. Specific examples of such bonuses and networks used to implement them include those as described in U.S. patents mentioned above and previously incorporated, as well as the various implementations described further below.

The promotion server 46 is coupled to a promotion database 47 and a modeling parameters database 49. The promotion server 46 includes functions and processes operative to generate signals to cause a system award to be generated, and to communicate the generated system award to the particular gaming device 12 at which the player receiving the award can receive the award.

Data of different types of system and/or bonus awards and how and when the awards are generated can be stored in the promotion database 47. For instance, the text that is printed on an award, or bar-codes that are printed on the award ticket can be stored on the promotion database 47. Modeling parameters and data can be stored on the modeling parameters database 49. For instance, conditions that when satisfied cause a ticket to be generated can be stored on this database. Such data could include the number of hours a player must play at a requisite coin-in level to cause a complementary meal ticket to be awarded to the player. Many examples of system awards and parameters used to implement them are discussed in detail below.

In determining when to grant a bonus or system award, the promotion server 46 can access data stored anywhere on the network, such as: from any of the databases 43, 45, 47 and 49; from the configuration workstation 40; from the bank controller 24; from the accounting system 38; and from the bonus engine 50 on any or all of the gaming devices 12 coupled to the computer network 10. Additionally, the computer network 10 illustrated in FIG. 1 is only an example gaming network. Those skilled in the art will appreciate that embodiments of the invention can operate on any acceptable network, even if it differs from the one illustrated in FIG. 1.

When the promotion server 46 determines that an award should be generated, it sends appropriate signals to the bonus engine 50 of the appropriate gaming device 12 through the gaming network 12 to deliver the award. As discussed above, one such method of award delivery is to cause an award ticket to be printed for the player, but others such as points, cash back, a promotional coupons can also be contemplated. Examples of bonuses that can be implemented on the network are disclosed in a co-pending application, now co-owned U.S. Pat. No. 6,319,125 (the '125 patent), which is incorporated herein by reference for all purposes. This co-owned patent also describes in more detail features of the network, like that shown in FIG. 1, which may be used to implement the present invention. The '961 patent also discloses bonuses that can be implemented by bonus and promotional servers 44, 46 and a network that could be used to implement the present invention.

As used herein the term jackpot indicates an award made resulting from the pay table on one of the EGMs while the term bonus indicates an award that does not result from the machine's pay table. The '125 patent and '961 patent include many examples of bonuses. The term award is intended to encompass any payment given to a player of one of the EGM's and includes both jackpots and bonuses.

Figure 2:
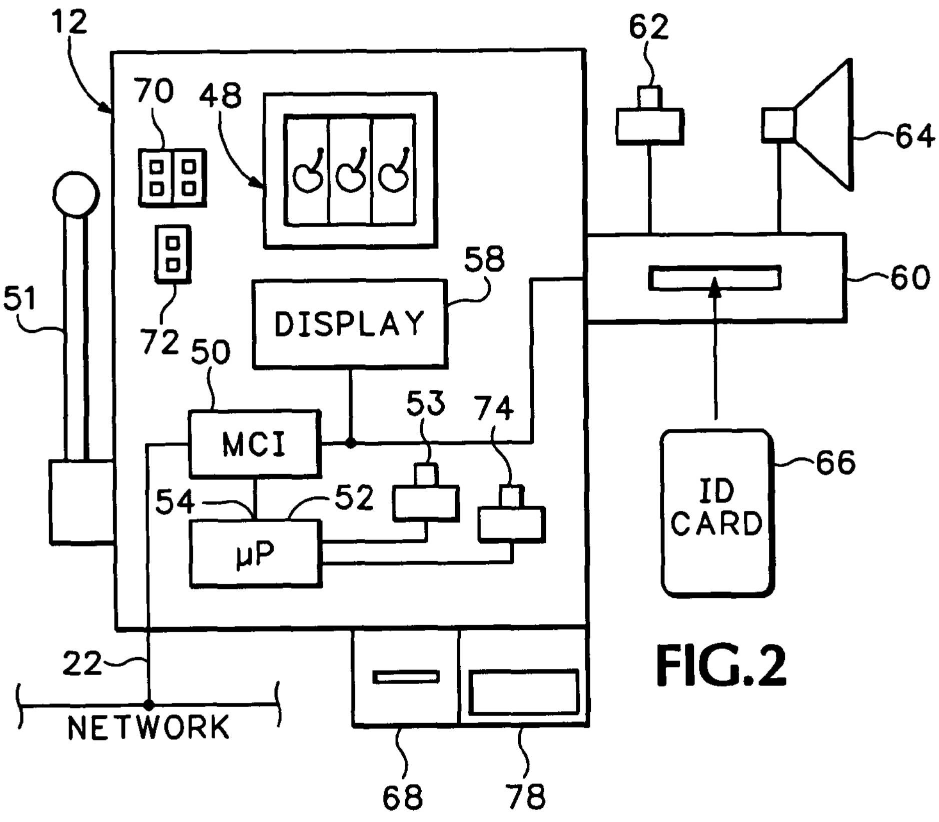
FIG. 2 is a schematic diagram of a slot machine and associated hardware, including the secondary bonus screen for displaying the bonus promotion implemented according to the invention.

FIG. 2 illustrates a gaming machine 12 constructed according to a preferred embodiment of the invention. Included is a highly schematic representation of an electronic slot machine—typical of each of the machines in the network—that incorporates network communications hardware as described hereinafter. This hardware is described in the '961 patent, and is referred to therein as a data communications node. Preferably the network communications hardware is like that disclosed in the '125 patent, namely a machine communication interface (MCI) 50.

MCI 50 facilitates communication between the network, via connection 22, and microprocessor 52, which controls the operation of EGM 12. This communication occurs via a serial port 54 on the microprocessor to which MCI 50 is connected.

Included in EGM 12 are three reels, indicated generally at 48. Each reel includes a plurality of different symbols thereon. The reels spin in response to a pull on handle 51 or actuation of a spin button 53 after a wager is made. In one specific implementation of the bonus, one or all of the reels 48 may include a special bonus initiator symbol which, when obtained on the gaming machine's payline, will cause the MCI 50 to initiate a secondary bonus game or other bonus event as described below.

MCI 50 includes a random access memory (RAM), which can be used as later described herein. The MCI also facilitates communication between the network and an liquid crystal display (LCD) or vacuum florescent display (VFD) 58, a card reader 60, a player-actuated push button 62, and a speaker 64.

Before describing play according to the invention, a description will first be made of typical play on a slot machine, like EGM 12. A player plays EGM 12 by placing a wager and then pulling handle 51 or depressing spin button 53. The wager may be placed by inserting a bill into a bill acceptor 68. A typical slot machine, like EGM 12, includes a coin acceptor that may also be used by the player to make a wager. Other elements incorporated into the electronic gaming machine 12 include a bill acceptor, coin-in meter, and a credit meter having a numeric display that indicates the total number of credits available for the player to wager. The credits are in the base denomination of the machine. For example, in a nickel slot machine, when a five-dollar bill is inserted into the bill acceptor, a credit of 100 appears on the credit meter. To place a wager, the player depresses a coin-in button, which transfers a credit from the credit meter to a coin-in meter. Each time the button is depressed a single credit transfers to the coin-in meter up to a maximum bet that can be placed on a single play of the machine. In addition, a maximum-bet button may be provided to immediately transfer the maximum number of credits that can be wagered on a single play from the credit meter to the coin-in meter.

When coin-in meter reflects the number of credits that the player intends to wager, the player depresses spin button 53 thereby initiating the base game.

The player may choose to have any jackpot won applied to credit meter 70. When the player wishes to cash out, the player depresses a cash-out button 74, which causes the credits on meter 70 to be paid in coins to the player at a hopper 78, which is part of machine 12. The machine consequently pays to the player, via hopper 78, the number of coins—in the base denomination of the machine—that appear on credit meter 70.

Card reader 60 reads a player-tracking card 66 that is issued by the casino to individual players who choose to have such a card. Card reader 60 and player-tracking card 66 are known in the art, as are player-tracking systems, examples being disclosed in the '961 patent and '125 patent. Briefly summarizing such a system, a player registers with the casino prior to commencing gaming. The casino issues a unique player-tracking card to the player and opens a corresponding player account that is stored on accounting system 38 (in FIG. 1). Accounting system 38 is referred to herein as a host computer. It should be appreciated, however, that the host computer can be distributed on the network and could include multiple processors or memories. The account includes the player's name and mailing address and perhaps other information of interest to the casino in connection with marketing efforts. Prior to playing one of the EGMs in FIG. 1, the player inserts card 66 into reader 60 thus permitting accounting system 38 to track player activity, such as amounts wagered and won and rate of play.

Turning next to FIGS. 3-6, indicated generally at 80 is the upper portion of slot machine 12. The slot machine is a commercially available electronic gaming device that has been modified as described herein.

Figure 9:
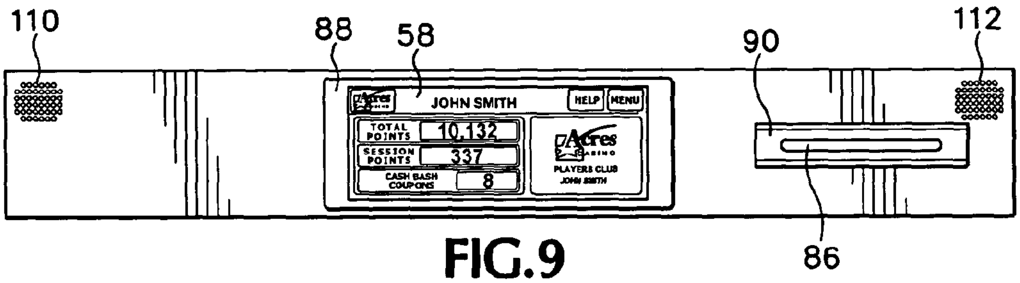
FIG. 9 is a view of the display and card reader on the slot machine of FIG. 3, including an image depicted on the display screen.

One aspect of the modifications to slot machine 12 includes addition of a bracket 82 mounted on the front of the slot machine. The bracket includes two openings, the first containing a 640.times.240 touch-panel liquid crystal display ("LCD") 58. In the present embodiment of the invention, LCD 58 comprises a Hitachi SX16H005-AZA LCD although it is of course possible to use other types of displays therein. The second opening 84, in FIG. 3, contains a card reader 60 having a slot 86 (visible in FIG. 9), into which a player's card is received as is known in the art. As shown in FIG. 9, both LCD 58 and slot 86 are framed by respective bezels 88, 90. Card reader bezel 90 and slot 86 are shown in FIG. 9.

It is understood that reels 48 in gaming machine 12 could be implemented under control of gaming processor 52 in electronic rather than mechanical form. Additionally, though the preferred embodiment describes a machine having separate elements for reels 48 and display 58, one would understand that such units could be combined in a single display without departing from the concepts embodied herein.

Figure 3:
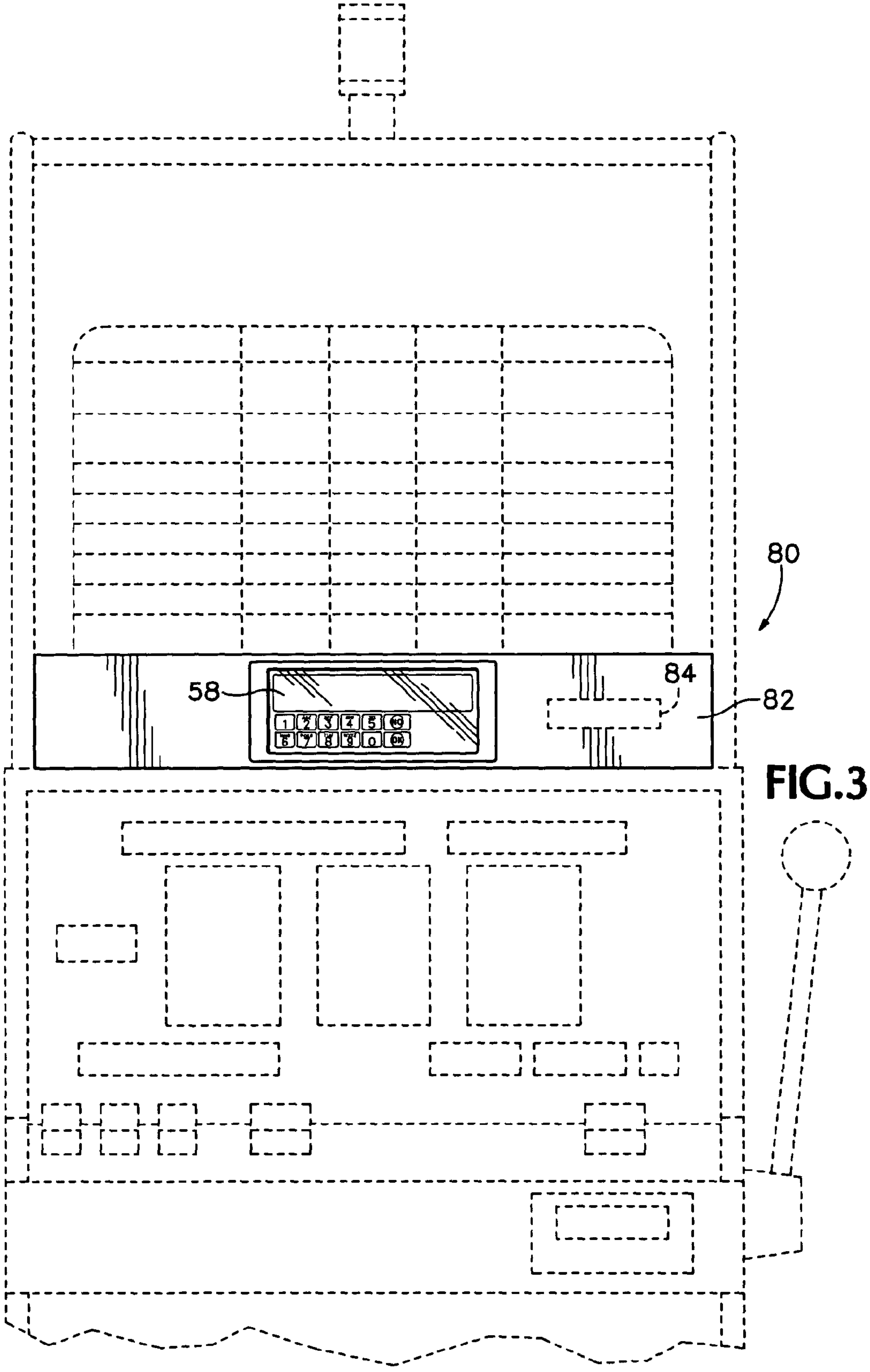
FIG. 3 is a partial view of a slot machine, shown in dashed lines, that is part of an implementation of the present embodiment of the invention, including an interactive display screen and card reader, shown in solid lines.
Figure 6:
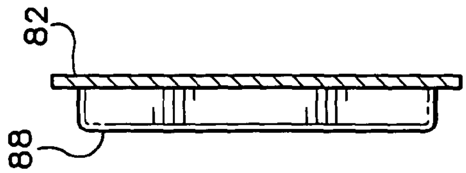
FIG. 6 is a bottom view of the view of FIG. 4.
Figure 4:
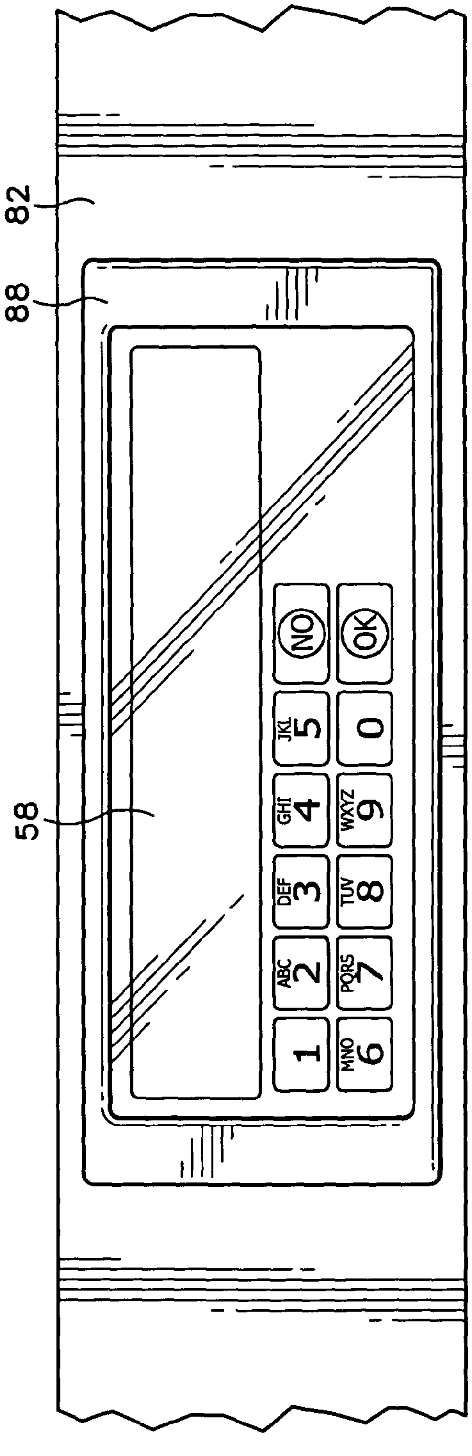
FIG. 4 is an enlarged partial view of the display of FIG. 3.
Figure 5:
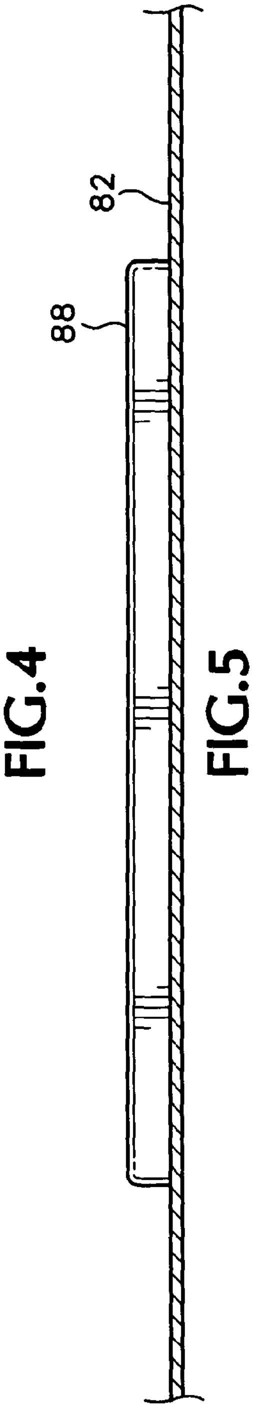
FIG. 5 is a right-side view of the display of FIG. 4.
Figure 7:
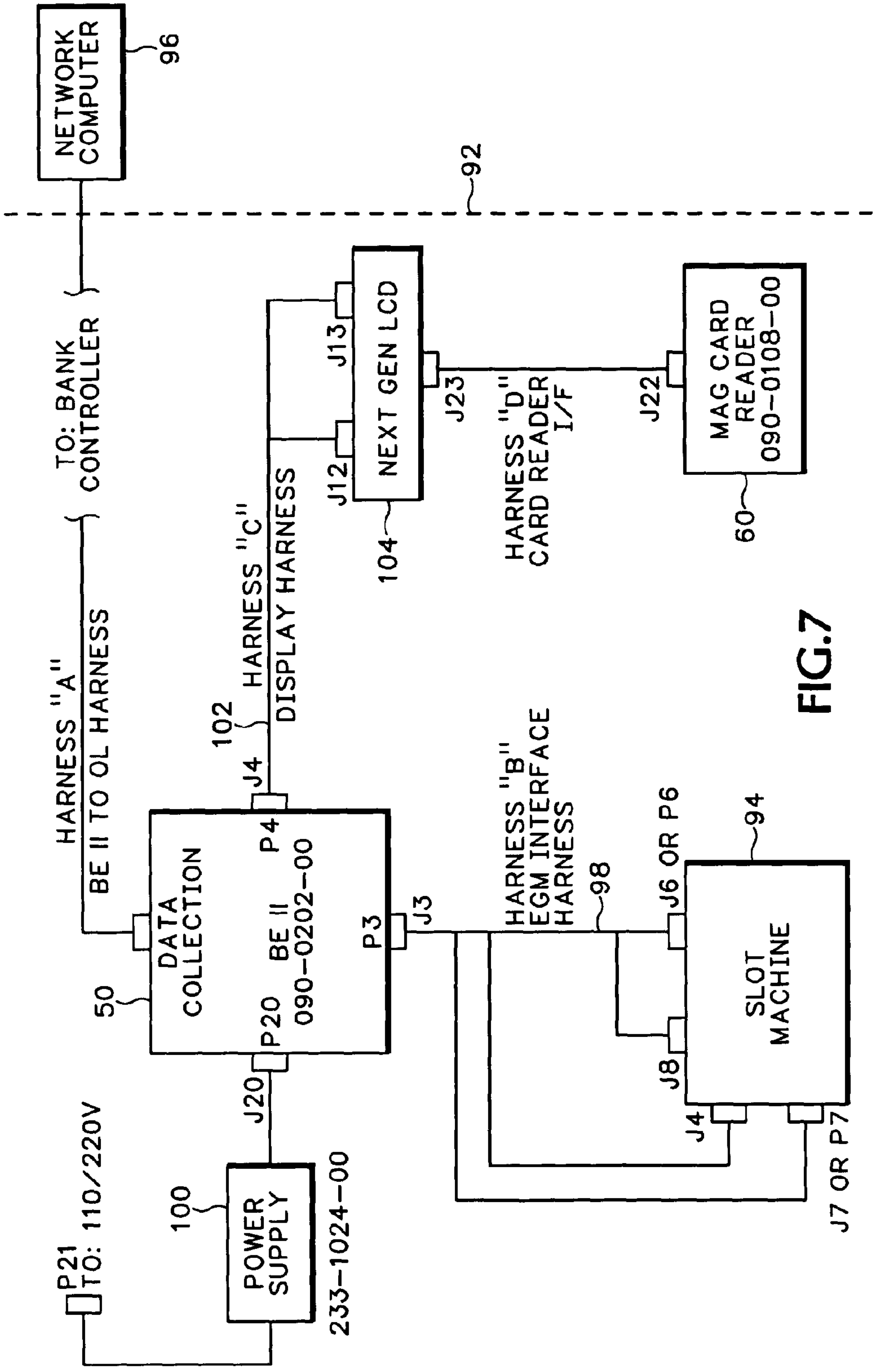
FIG. 7 is a schematic view of the slot machine display and card reader of FIG. 3 depicting the manner in which circuitry associated with each is connected to a network of similar slot machines incorporating displays and card readers.

Turning now to FIG. 7, the schematic components depicted therein on the left side of dashed line 92 are all contained within the cabinet that houses the upper portion 80 of slot machine 12 in FIG. 3. Slot machine electronics 94 is part of the original slot machine structure provided by the slot-machine manufacturer. The additional components on the left side of line 92, however, are all added to implement the invention in association with electronics 94 and the network.

The components within the slot machine, i.e., on the left side of line 92, are connected to a computer network, along with numerous additional slot machines 12, 14 having the related structure depicted in FIG. 7. The network is illustrated as a computer 96 on the right side of dashed line 92. Networked slot machines are known in the art and are depicted in the '961 and '125 patents. The network is shown generally in FIG. 1 and includes databases for storing slot machine transactions within accounting system 38 and player tracking data within player server 42, servers 44,46 for implementing system games and bonuses, and configuration work stations 40 for configuring the system games and bonuses. The network further includes a Content Manager, which is a program implemented on a network computer such as configuration work station 40 that permits an operator of the system, typically a casino, to customize and configure images that appear on display 58.

The slot-machine electronics 94 are connected to a system-machine interface (MCI) board 50 via a wiring harness 98. Board 50 provides communications between the slot machine electronics 94 and network 96 in a manner that is described in the '961 and '125 patents. A power supply 100 provides power to board 50. A wiring harness 102 connects board 50 with the display and associated electronics 104. Another harness connects board 50 to the network including computer 96. The power supply also supplies power to electronics 104 and to a card reader 60. The card reader is behind bezel 90 in FIG. 9 and includes slot 86.

Figure 8:
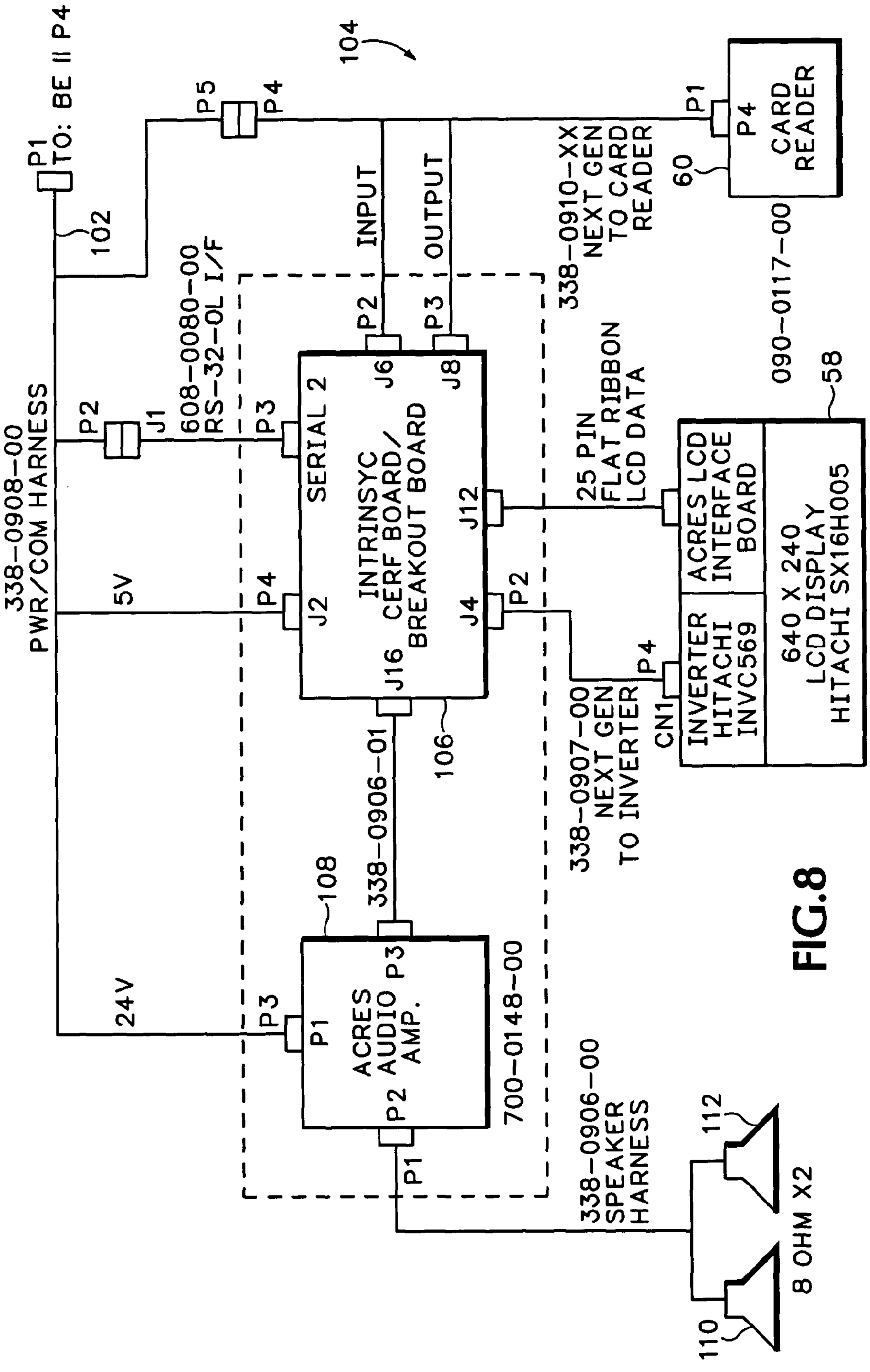
FIG. 8 is a schematic view of the display and related components of FIG. 7.

Turning now to FIG. 8, additional details of the display and associated electronics 104 in FIG. 7 are depicted schematically.

A dedicated computer 106 includes an LCD controller and electronics for enabling VGA touch panel images and sound for LCD 58. In the present embodiment of the invention, computer 106 is a commercially available processor board manufactured by Intrinsyc. It includes an Intel ARM processor and a Windows CE operating system. Computer 106 also includes nonvolatile memory for storing images and sounds that are utilized as described hereinafter. An amplifier 108 provides sound signals to speakers 110, 112, which are partially visible in FIG. 9. It is understood that the system electronics 104 can be wired by those knowledgeable in the art to also or instead utilize the base game speakers 64 (FIG. 2) rather than just dedicated speakers 110, 112.

In the present embodiment of the invention, the networked slot machines are initially configured using the Content Manager, which—in the present embodiment of the invention—runs on the same network PC platform as configuration work station 40 (FIG. 1), and enables files to be downloaded to the system-machine interface board, like board 50, associated with each slot machine. Once the screens and features of individual screens are selected at the Content Manager, an initialization file is created that identifies which MMC files and features have been selected. The configuration workstation can then be used to download the initialization file and associated MMC files to all the machines, to groups of machines, or even to a single selected machine. These initialization files and associated MMC files are stored in nonvolatile memory in electronics 104. All parameters associated with the audio content and with display 58 can be configured in this manner.

In operation of the prior art VFD, System Tokens—such as a player's name or accrued points—are embedded in a slot-machine message comprising otherwise constant text strings that appear on the VFD. For example in the message Hello Richard, Hello comprises a constant text string and Richard comprises the System Token, here, the player name associated with the player card in use.

In the present invention, an MMC Token is embedded in the prior art VFD message, which may includes System Tokens, that is transmitted to board 50 by the network and from there to board 106. As a result, if the message is received by a slot machine with a VFD, the usual VFD message is displayed. If it is received by a slot machine with an LCD, the MMC message identified by the MMC Token is called from storage in electronics 106 and run, incorporating any System Tokens as specified in the network message. But when a VFD message that does not include an MMC Token is received at an LCD machine, the FIG. 10 emulation screen appears bearing the VFD message in the upper half, and emulating a prior art keypad, which is associated with the VFD in prior art machines. This feature permits gradual introduction of LCD machines on a network and gradual introduction of MMC messages to any LCD machines that are on the network. Multimedia content can thus be downloaded on the gaming-machine network and displayed on the LCD as described above.

Figure 10:
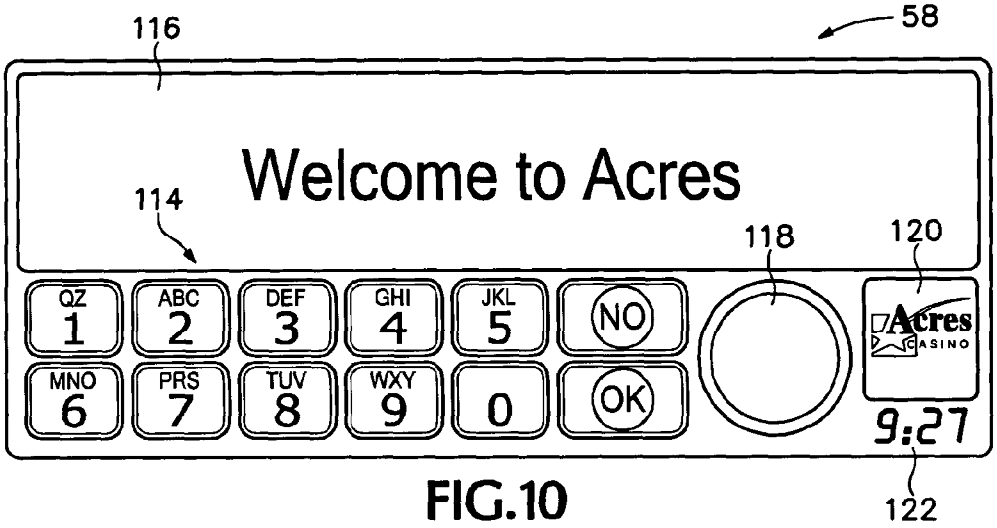
FIGS. 10-14 are enlarged views of the display screen depicted in FIG. 9 with images displayed thereon as described in the following detailed description.

In FIG. 10, display 58 is shown with an image that appears when the system emulates a prior art vacuum florescent display (VFD), like that disclosed in the '961 and '125 patents. The touch screen display image includes a keypad 114, a message screen 116, a bonus button 118, a casino logo 120, and a time display 122. Unless it is otherwise clear from the context, use of the term "button" herein refers to an image of a button on the touch screen, which enables a player to interact with the network by touching screen 58 over the button image. The casino operator has the option, implemented via the Content Manager, of displaying various features such as the bonus button and the system time, dependent upon the operator's preference.

Emulation mode is advantageous in two situations. First, if the touch screen display has not been configured or configured incorrectly, the image of FIG. 10 appears. Second, when prior art systems are retrofitted to include some slot machines that incorporate the touch screen LCD of the present invention and others that incorporate the prior art VFD, there may be some network display messages that are not implemented with the multimedia content ("MMC") used by LCD 58. If so, the system defaults to VFD emulation mode, in which VFD messages are displayed on message screen 116, while the player enters commands using keypad 114 and bonus button 118. In this mode, touch keypad 114 and the message panel 116 emulate the behavior of the prior art VFD and keypad, respectively.

In another embodiment of the invention, a separate network, i.e., a different network from the one computer 50 is on, is connected to board 106. This separate network provides MMC to board 106 for displaying images or playing audio. Such a network could be used to deliver real-time multimedia content to the display 58 and speakers 110, 112. In addition, this network is used to deliver real-time video, either broadcast or closed circuit, to the display while play is ongoing. The keypad image on the touch screen display is used by the player to select a broadcast or closed-circuit channel. This configuration could permit a player to watch, e.g., a sporting event or other show while gaming.

Figure 11:
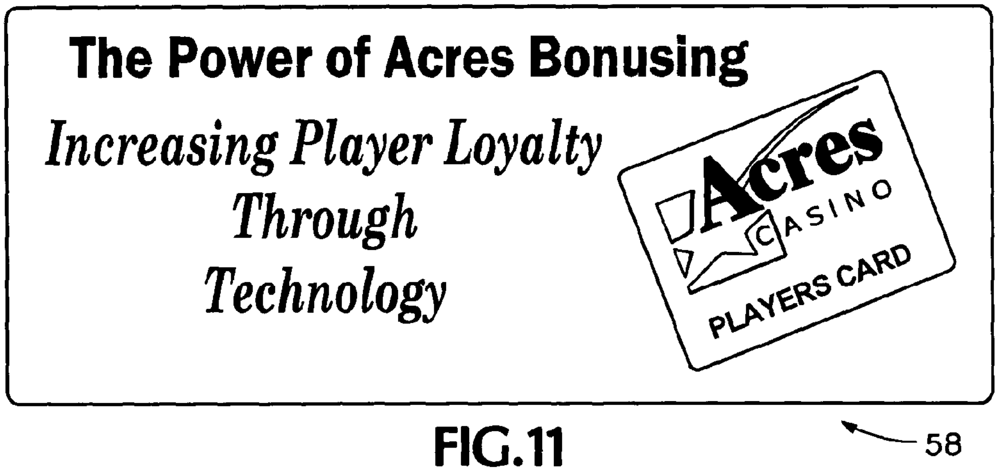

FIG. 11 depicts an example of display 58 in idle-attract mode, i.e., when there is no player card inserted in slot 86. When there is no card, the system displays up to 32 full size screens in a repeating sequence. Using a computer and keyboard on the network, the operator can control the duration, time of day, and sound associated with the idle-attract mode.

Figure 12:
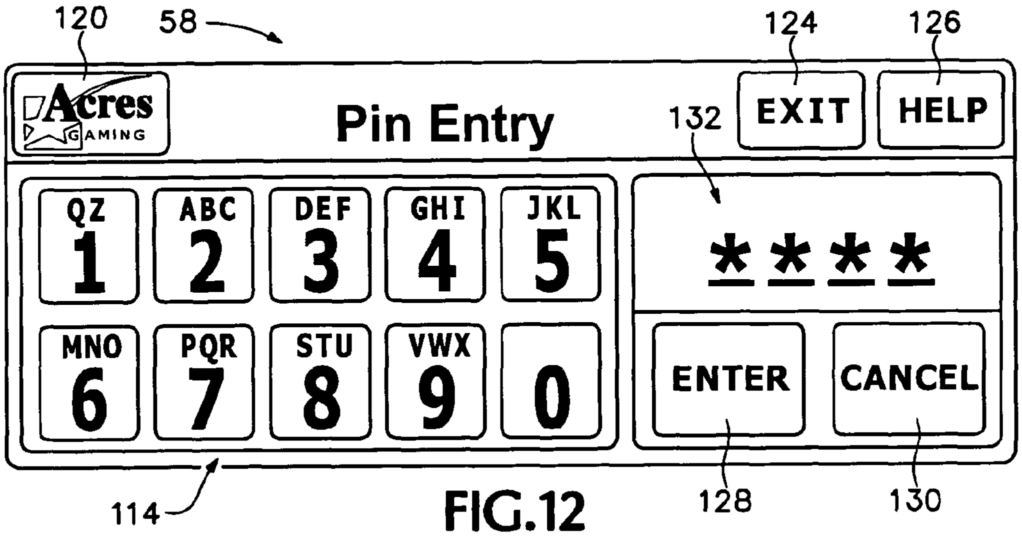

Turning to FIG. 12, the display is shown as it appears after a player enters his or her card into slot 86 of the card reader. This display includes a title, Pin Entry, PIN being an acronym for Personal Identification Number, a number that is stored on the network in association with the player's account. Also included is a casino logo 120, in the present embodiment of the invention, the logo of the assignee being utilized for illustrative purposes. In the upper right-hand corner of the display are an Exit button 124 and a Help button 126. Exit button 124 permits the player to cancel current operations or to move back to the previous screen. In FIG. 12, if Exit button 124 is pressed, the system resumes the idle-attract mode of FIG. 11. Pressing Help button 126 retrieves up to 8 screens of help information that can be configured on the Content Manager software.

The display of FIG. 12 also includes a touch keypad 114, a touch Enter button 128, a touch Cancel button 130, and a PIN entry field 132, which displays an asterisk each time a digit from the player's PIN is entered on keypad 114.

In operation, when a player enters his or her card into slot 86, the FIG. 12 image appears on display 58. The player enters the PIN associated with the player card by pressing the digits on keypad 114 and hitting Enter button 128. The Content Manager can be used to change the number of PIN digits required. There is also an auto enter feature that can be implemented at the Content Manager that sends the PIN to board 50 without waiting for the player to push the Enter button.

To induce the player to use the card, the casino awards each player points proportional to the money wagered by the player. Players consequently accrue points at a rate related to the amount wagered. The points are displayed on display 58. In prior art player tracking systems, the player may take his or her card to a special desk in the casino where a casino employee scans the card to determine how many accrued points are in the player's account. The player may then redeem points for selected merchandise, meals in casino restaurants, or the like, which each have assigned point values.

Bonus configuration software is operable on network computer 96, such as configuration workstation 40, to generate one or more rules detailing the operation of the bonus game on LCD display 58. FIG. 15 illustrates a table listing multiple selectable elements defining the bonus game, including machines applied to, triggering mechanisms, interfaces/games, awards, and currency won. An operator selects at least one element from each column to define a bonus game or rule. For multiple selections within any one column, it is possible to use Boolean concepts, such as logic OR or AND, to establish the rule. For example, an OR logic selection as applied to the multiple selected triggers would fulfill the trigger rule if the condition for any one trigger is fulfilled—as when a player fulfills either the player demographic designated ("from Chicago") or the player frequency criteria ("visited for the third consecutive day"). For an AND logic selection as applied to multiple triggers, each one of the trigger criteria selected must be fulfilled in order to meet the trigger rule—as when a player is associated with both a high roller group and has played for at least twenty continuous minutes. Once defined, the rule is transmitted through the gaming network and stored on the individual gaming machines 12, 14, in particular the MCI 50 units that operate the bonus game on the gaming machines.

The concepts described for generating and implementing a bonus rule is not intended to be limited to situations where the rule is stored at the gaming machine. In situations where the gaming machine 12 is configured to act as a dumb terminal under control of a remote computer, such as bonus server 44, the rule can be stored at the server 44 and display or operational instructions can be transmitted through the gaming network to the gaming machine 12.

Next is a description of the five main elements making up the bonusing system according to the invention.

1. Machine Selection:

The machine selection tool allows the operator to control which machines the rule applies to. For instance, the rule can be applied to all machines or a selected subset of machines within the casino or in multiple properties, shown in FIG. 15 as "groups". The rule can also be applied to individual machines.

2. Triggers:

The working definition of triggers is any single event or series of events caused by the customer or the slot machine that meets a given criteria established by the casino operator. If the criteria is met, the player tracking system responds by giving a promotion, game, or Bonus to the customer via the touch screen display. For example, a trigger might be a certain number of points earned for the day, or a certain number of four of kinds won over a weekend. A fairly comprehensive list of triggering events is listed below.

1TABLE 1 List of Triggers: Machine Outcome Player Behavior Random Triggers Specific Game Outcomes Points Earned Lucky Coin Series of Game Outcomes Win/Loss Per Unit Lucky Time of Time Sets of Game Outcomes Visitation Lucky Game Frequency Consecutive Game Outcomes Handle Per Unit Electronic Drawing of Time X outcomes in N tries Continuous Play Outcome sets/unit time Specific Player Demographics Outcomes relative to others Sets of Player Demographics Trigger Definitions:

The "Specific Game Outcomes" triggering event occurs when the player obtains a predefine result on the gaming machine primary game. Examples include a four-of-a-kind in a poker game, seven-seven-seven in a slot game, or obtaining a particular bonus symbol on one of the reels. A secondary screen presented to the network operator when selecting this triggering event allows the operator to specify the particular game outcome(s).

The "Series of Game Outcomes" triggering event occurs when the player obtains certain results during multiple plays on the gaming machine primary game in a predetermined order. One example is where a player obtains on a video poker machine a pair, two pairs, three-of-a kind, straight, and flush in that order but not necessarily consecutively. A secondary screen presented to the network operator when selecting this triggering event allows the operator to specify the game outcomes and the order in which they are to occur.

The "Sets of Game Outcomes" triggering event occurs when the player obtains certain results during multiple plays on the gaming machine primary game regardless of order. Examples include a player receiving his/her fourth four-of-a-kind on a video poker machine, or a player obtaining jackpot payouts on each of the possible paylines in a slot-based game. A secondary screen presented to the network operator when selecting this triggering event allows the operator to specify the game outcomes required for the trigger.

The "Consecutive Game Outcomes" triggering event occurs when the player obtains certain consecutive results during multiple plays on the gaming machine primary game. Examples include a player winning on five consecutive hands or receiving two consecutive hands containing three-of-a-kind on a video poker machine, where a player receives a particular bonus symbol on the payline of a slot machine three consecutive times, or where a player fails to win a paytable award despite twenty consecutive tries. A secondary screen presented to the network operator when selecting this triggering event allows the operator to specify the game outcomes required to activate the triggering event.

The "X Outcomes in N Tries" triggering event occurs when the player obtains certain results during multiple plays on the gaming machine within a certain number of tries. Examples include a player obtaining a both a straight and a flush within five games of one another but not necessarily consecutively or in that order, or where a player obtains seven-seven-seven during the first 50 plays of a particular slot machine. A secondary screen presented to the network operator when selecting this triggering event allows the operator to specify both the game outcomes and the number of the plays limitation.

The "Outcome Sets/Unit Time" triggering event occurs when a player obtains certain results during multiple plays on the gaming machine primary game within a set period of time. Examples include a player obtaining 20 jackpot awards on a slot machine within a five minute period, and a player obtaining three flushes within a one-hour period on a video poker machine. A secondary screen presented to the network operator when selecting this triggering event allows the operator to specify the game outcomes and the time limit required for the trigger.

The "Outcomes Relative to Others" triggering event occurs when a player obtains a certain result or results on the gaming machine primary game before his/her fellow players at the group of games specified. Examples include the first player in a bank of video poker machines to receive a four-of-a-kind of Aces, or the first one to twenty wins. A secondary screen presented to the network operator when selecting this triggering event allows the operator to specify the game outcome(s) required for the trigger.

The "Points Earned" triggering event occurs when a player earns a certain number of bonus points, Xtra credit points, or even credits. A secondary screen presented to the network operator when selecting this triggering event allows the operator to specify both the point total required and the type of points (e.g., bonus, Xtra credit, or credits) earned.

The "Win/Loss Per Unit of Time" triggering event occurs when a player obtains a certain number of wins or loses on a gaming machine primary game over a predetermined time period. Examples include a player losing 100 times over a 20 minute time period, or where a player wins 7 times over a one-minute period. A secondary screen presented to the network operator when selecting this triggering event allows the operator to specify whether losses, wins or both are tracked, the number, and the time period required for the trigger.

The "Visitation Frequency" triggering event occurs to reward players for frequent visits to the casino(s). Examples include triggering the bonus upon the third consecutive day the player visits a particular casino, the fifth visit to any casino within a group of casinos within a year, or after a player has played for a total of twenty-four hours of non-continuous play. Flags maintained within the player record and stored on player servers within the gaming network would allow a casino to track this type of visitation and play criteria over a long period of time. A secondary screen presented to the network operator when selecting this triggering event allows the operator to specify the frequency criteria required for the trigger include number of visits, whether on consecutive days, total hours, etc.

The "Handle Per Unit of Time" triggering event occurs for players betting a certain amount over a certain time period. Examples include a player betting at least a total of $500 at a slot machine over a one-hour period, or where a player bets his/her 1000.sup.th coin at a nickel poker machine. A secondary screen presented to the network operator when selecting this triggering event allows the operator to specify the total bet amount or coin number and the time limit required for the trigger.

The "Continuous Play" triggering event occurs after the player has played on a machine for a preset time period. For instance, the bonus promotion might be triggered every ten minutes of play, or a super promotion after two hours. A secondary screen presented to the network operator when selecting this triggering event allows the operator to specify the time limit required for the trigger.

The "Specific Player Demographics" triggering event occurs only for those players fitting the specific profile designated. For instance, the casino might run a promotion where players from Chicago or from out of state receive the promotion the first time during any one day that they play particular machines. The demographic information is stored in the player tracking server on the gaming network with the player ID established by inserting the player tracking card and/or typing in a PIN. A secondary screen presented to the network operator when selecting this triggering event allows the operator to specify the game demographics required for the trigger. Player demographics can include player grouping or ranking used to signify the betting patterns of different players with high rollers having higher rankings than lower betting players.

The "Sets of Player Demographics" triggering event occurs only for those players fitting at least two or more (and alternately all of the) designated profiles. For instance, the casino might run a promotion for seniors aged 65 and older who come from out of state. Again, the demographic information is stored in the player tracking server on the gaming network with the player ID established by inserting the player tracking card and/or typing in a PIN. A secondary screen presented to the network operator when selecting this triggering event allows the operator to specify the profile characteristics required for the trigger.

The "Lucky Coin" triggering event occurs for the player inserting the xth coin-in on a certain designated bank of games. A secondary screen presented to the network operator when selecting this triggering event allows the operator to specify the coin-in number required for the trigger.

The "Lucky Time" triggering event occurs for a random player playing at a designated time of day. A secondary screen presented to the network operator when selecting this triggering event allows the operator to specify the time of day in which the trigger is activated.

The "Lucky Game" triggering event occurs for a random player.

The "Electronic Drawing" triggering event occurs where a player obtains drawing tickets for amounts wagered and a where, periodically, a randomly selected drawing ticket is chosen for the bonus award designated. For instance, each player in the casino might obtain a drawing ticket for each $50 wagered with an accompanying animation displayed on the LCD 58, and the winning ticket selected each hour again with accompanying animation. A secondary screen presented to the network operator when selecting this triggering event allows the operator to specify the wager required per ticket and the drawing periodicity.

These are only a sample of potential triggering events that can be contemplated and the invention should not be so limited to those disclosed and described. Player grouping is analogous to machine groups. Players can be divided into groups based on historical behavior, demographic characteristics, and personal interests. Bonus eligibility and functionality parameters can be modified based on what groups players fall into. The thought is that bonuses can be tailored to be appealing to each group. Upon player card insertion, the group information is retrieved from the database. The MCI 50 then determines eligibility for bonuses based on group information, and adjusts bonus parameters accordingly. It is contemplated, for instance, that bonus tables can be constructed to award players different amounts based on tracked levels of play, or by predetermined importance placed on the player.

3. Interface:

The interface is defined as the activity that occurs on the screen of the display; upon the system recognizing a player has achieved a defined trigger. The interface activity could require a customer to pick an object or watch an animation. The interface may, alternately, require a series of steps to complete a given promotion so that an award may be given. 2TABLE 2 List of Possible Interfaces: Description Definition Animation The display shows an animation, without requesting action from a player. Multi Animations Multiple animations displaying the promotion in a series. Start Touch (general this action can The display requests the player to touch the screen, apply to many different variations thus causing an animation to occur. A timeout of the interface.) may be associated with requesting a player's interaction. Stop Touch (general this action can The display shows an animation, requesting a apply to many different variations player to touch the screen to stop the animation. of the interface.) The customer may believe there is a skill factor to stopping the animation Sum of Items (general this action The chosen value to be awarded can be broken into can apply to many different several different values that add up to the chosen variations of the interface.) value. Combination Pay table (general this A particular outcome is tied to a value based upon action can apply to many different a pay table. variations of the interface.) Pick x of n The player chooses a number of items based out of a total number of possible items. Pick x of n with Stop The player chooses items out of a total number of possible items until a stop item is chosen. Match x of n The player chooses items until x number of matching items are chosen out of a total number of possible items. Items can contain a value or they can be images that tie to a fixed pay table. Match x of n, faster. The faster the player matches an items, the larger the award. The award decrements on missed opportunities to make the match. Take Offer, x of n Player chooses to take the first offer or risk the amount for a second offer. The number of opportunities to risk the offer is based on x of n. Pick x of n, with opportunity to The player chooses items out of a total number of repack possible items, with the opportunity to redraw, if the player does not like the first pick. Time Element (general this action Players may have the opportunity to earn can apply to many different promotions that require them to continue to variations of the interface.) gamble a certain amount of money, earn a certain amount of points, or gamble for a certain amount of time. Persistence—x of n, over some time Player has opportunity to pick pieces of an image element over some element. Upon revealing an image, the player wins an award. Receive Chances, over some time Player earns opportunities to win an award to be element won at a later element.

4. Award:

Award is defined as the method the computer uses to choose a value to award to the customer through the interface. Two types of methods are described in this document. 3TABLE 3 Award Methods: Description Definition Win Item A random number is chosen based upon a probability weighting. The random number is associated with an item of value, i.e. coins, comps, etc. Script A random number is chosen based upon a Method probability weighting. The random number is associated with an item of value. The item of value could be awarded over several smaller sessions that add up to the total value.

5. Currency:

Currency is defined as the item of value awarded to the player through the interface. A player chooses x of n, and wins something of value. Below are list of possible items of value: 4TABLE 4 List of Currency: Complementary Goods and Services Extra Credit Cash Back Promotional Credits Points Discount Coupons

EXAMPLES

A. Pick x of n

Figure 16:
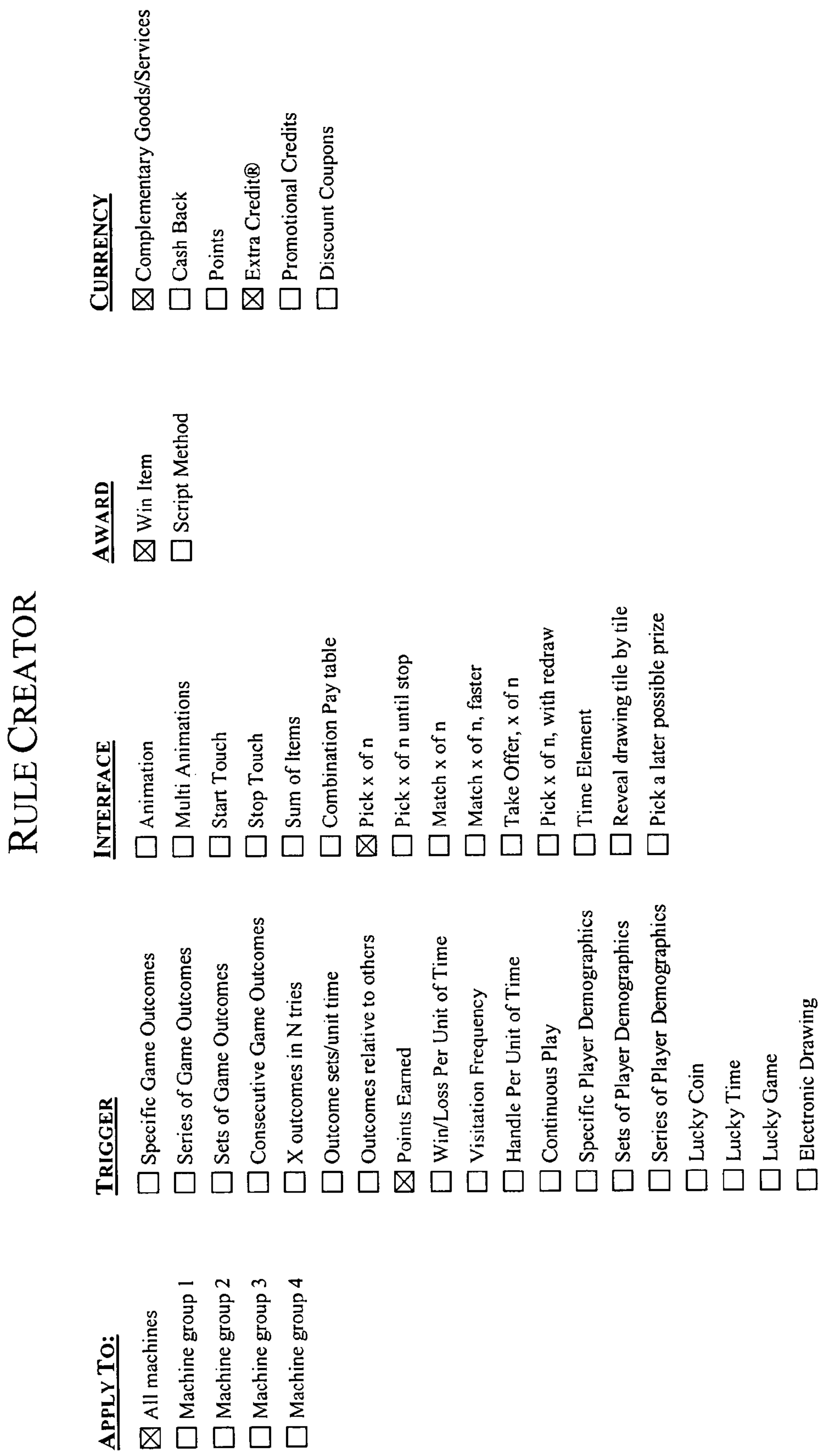

FIG. 16 shows the rule elements selected by the operator of the Content Manager program at the configuration workstation 50 to create the following bonus game. The trigger could be that the customer receives an opportunity to Pick x of n every time that he earns 50 bonus points. Selection of the various criteria, for instance the "points earned" criteria in the trigger column, may result in the display of a subscreen (not shown) on configuration workstation on which the point total trigger amount may be specified and incorporated within the rule. Upon earning the designated bonus points, the Touch Screen Display kicks off an animation with sound notifying the player that they are receiving a promotion. The customer then is asked to pick x of n items; for this example, the customer would have 2 choices out of 10. The values associated with each item could configure to be based upon a script method or via direct probability outcome. Upon choosing the two choices, the Touch Screen Display would show the value of each item picked. The Touch Screen Display could, for example, show the customer what they could have picked by showing the values of the remaining items. An animation would occur adding the values and paying the customer via an Extra Credit® software sold by the assignee of the current invention. Another alternative payment would be in the form of complementary meals (comps). One of the items picked might be a buffet comp for two. The comp would be printed via a ticket printer or the customer might be informed to pick up the comp at the reward center.

B. Match x of n

Figure 17:
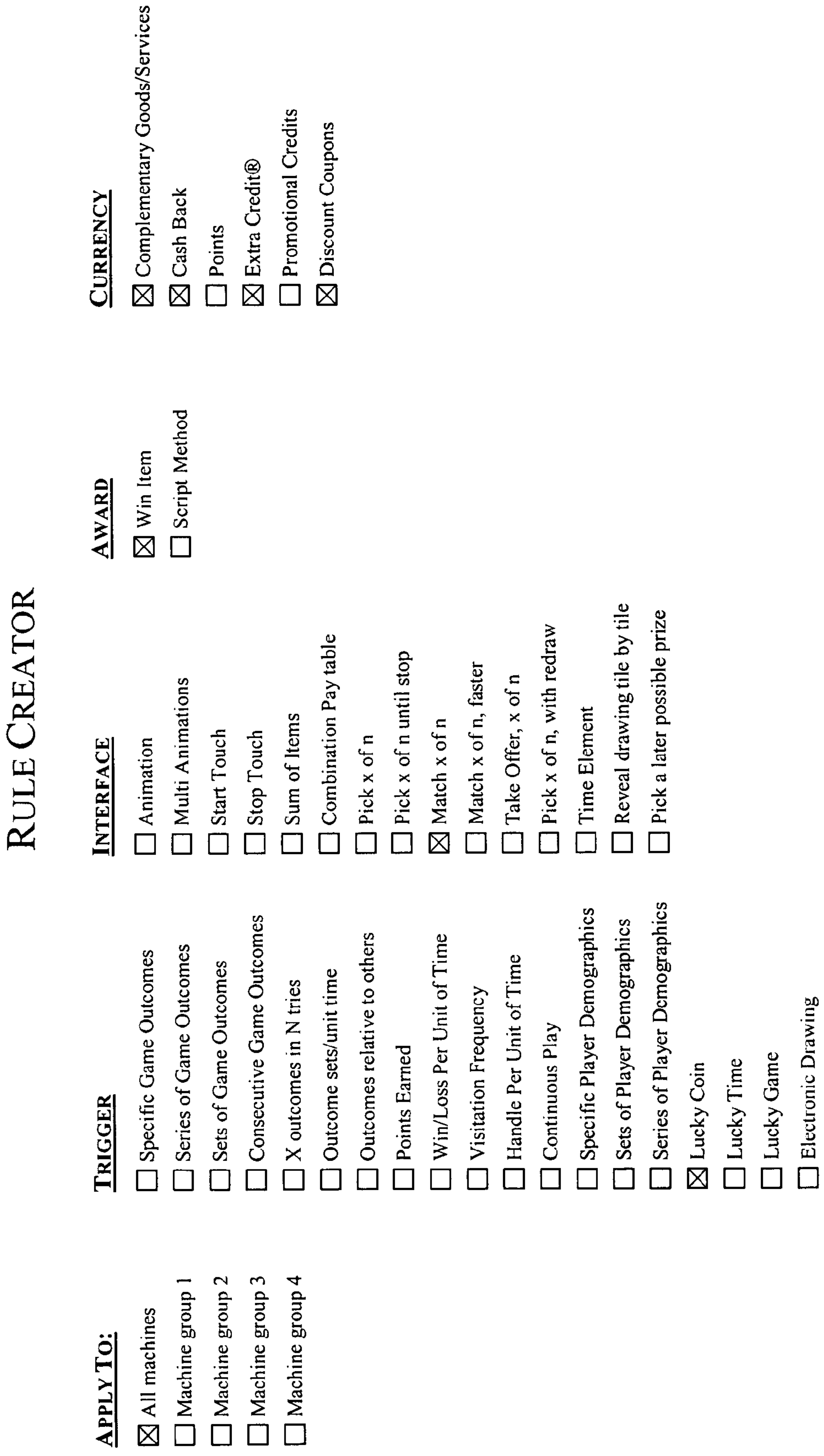

FIG. 17 shows the rule elements selected by the operator of the Content Manager program at the configuration workstation 50 to create the following bonus game. This concept requires that a customer match two images to receive payment. The opportunity to pick could be triggered based upon the patented Lucky Coin® mechanism described in co-owned U.S. Pat. No. 6,375,569, which is based upon a minimum number and maximum number of coin-in values. Each number between minimum and maximum is equally likely to occur. At the beginning a random number generator picks a value that will trigger the promotion between these possible minimum and maximum values, and the players thence progress towards the trigger amount.

Figure 13:
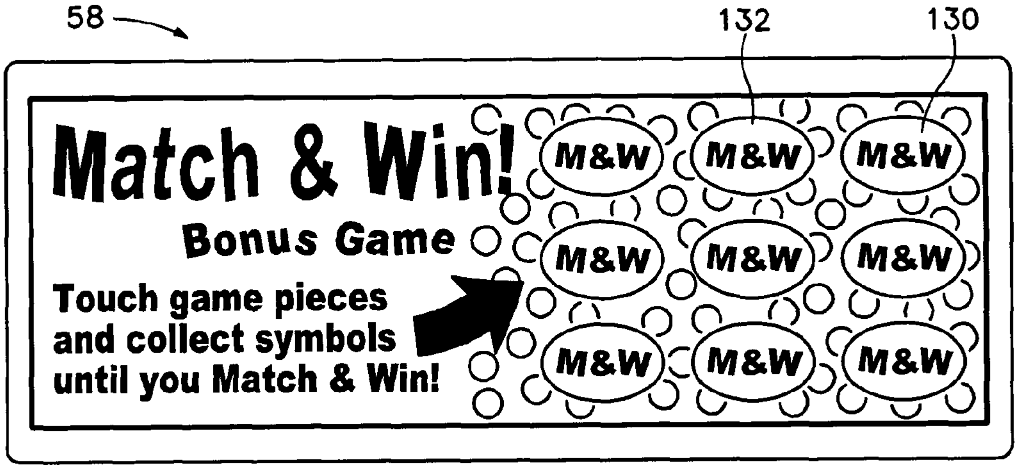
Figure 14:
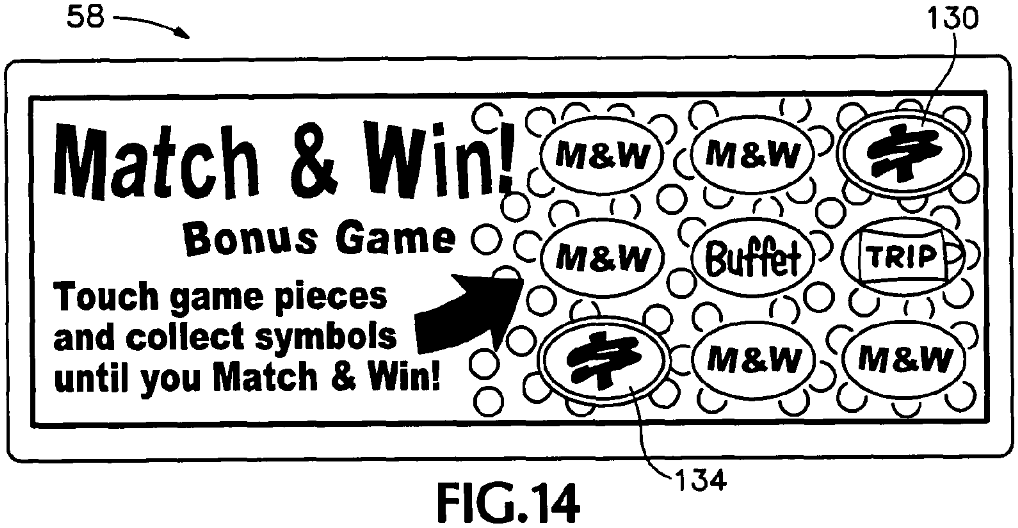

Upon receiving an opportunity to Match x of n, the Touch Screen Display shows an animation that ends with a screen, where the customer can choose objects until they match. FIG. 13 shows an animation displayed on touch screen LCD 58 displaying the "match & win" bonus promotion initialization. In this example, the customer may choose from nine objects 130,132. Each object has a value that is uncovered after the customer touches the object. Upon matching the first two objects, the customer is then awarded the value of those objects. An example is that the value could be awarded via Extra Credit® or—as shown by the '$' symbol match in FIG. 14 in uncovered object spaces 130,134—a certain amount of cash back.

C. Start and Stop Animation

FIG. 18 shows the rule elements selected by the operator of the Content Manager program at the configuration workstation 50 to create a "start and stop" animation game. As a player plays, they obtain a specific outcome. In our example the player hits a red symbol, a white symbol, and a blue symbol; this triggers the customer's opportunity to play a slot machine on the Touch Screen Display. The customer is required to touch the display to start the animated slot machine. The player is also required to stop each of the animated reels, which for example would be three. Upon stopping the three reels, a value is or is not awarded depending on the combination of symbols and value associated with symbols on the pay table. The value won can be awarded via Extra Credit®.

Having described and illustrated the principles of the invention in a preferred embodiment thereof, it should be apparent that the invention can be modified in arrangement and detail without departing from such principles. We claim all modifications and variation coming within the spirit and scope of the following claims.

The invention claimed is:

1. A method for operating networked gaming machines, each having at least one payment acceptor, to remotely configure a bonus game on at least one of the networked gaming machines, at least some of the gaming machines being of a type having a base game display area and a bonus game display area, the method comprising:

receiving, by a processor at a configuration station at a location remote from the networked gaming machines, a selection from an operator of the networked gaming machines at least one of a plurality of possible bonus game triggering criteria displayed in a list to thereby define a bonus game triggering criterion related to at least one of a base game and the bonus game, wherein the selected triggering criterion is based at least partially on multiple selected outcomes of the base game and is specific to a particular player playing the base game, the at least one payment acceptor receives physical media having a monetary value to establish a credit balance for a placement of one or more bets and to receive potential winnings resulting from one or more awards of the base game or bonus game;

receiving, by the processor from the location remote from the networked gaming machines, a selection of at least one of a plurality of possible visual activities displayed in a list for presentation on the bonus game display area of the gaming machine to which the triggering criterion is related;

receiving, by the processor from the location remote from the networked gaming machines, a selection of at least one of a plurality of award methods, wherein each of the plurality of award methods defines a method used to determine an item of value to be awarded; and operating one of the gaming machines in accordance with the stored selections including:

detecting, via a processor, the selected triggering criterion; and triggering the operation of a bonus game on a gaming machine being played by a player associated with the player data and to which the determined one or more of the selected triggering criterion corresponds to.

2. The method of claim 1, said method further including displaying the selected visual activity on the bonus game display area of the gaming machine responsive to determining one or more of the selected triggering criterion.

3. The method of claim 1, said method further including awarding the item of value earned based on the selected award method.

4. The method of claim 1, said method further including:

identifying a player of the gaming machine by player interaction with the gaming machine; and tracking play of the identified player on the base game of the gaming machine and compiling outcomes at the gaming machine for that identified player, said triggering criterion operating to trigger the bonus game according to the bonus game triggering criterion when the compiled outcome matches the triggering criterion.

5. The method of claim 4, wherein said triggering criterion is based upon a set of game outcomes.

6. The method of claim 4, wherein said triggering criterion is based X outcomes in N tries.

7. The method of claim 4, wherein said triggering criterion is based upon a set of game outcomes within a set period of time.

8. The method of claim 4, wherein said triggering criterion is based upon visitation frequency.

9. The method of claim 4, wherein said triggering criterion is based upon player demographics.

10. The method of claim 1, wherein the selected triggering criterion includes a plurality of triggering criteria and wherein the bonus game is triggered responsive to any one of the plurality of triggering criteria.

11. The method of claim 1, where each of the plurality of gaming machines is associated with one or more gaming machine groups, and at least one of the groups is selected at the configuration workstation so that the bonus promotion defined by the selected triggering criterion and operable on the bonus display area of each of the gaming machines is potentially triggered only on gaming machines within the selected group and not on gaming machines not within the selected group.

12. The method of claim 1 wherein the selected bonus game triggering criterion includes a first bonus game triggering criterion, and the selected visual activity includes a first selected visual activity, the method further comprising:

selecting at a configuration workstation a second bonus game triggering criteria from the displayed list to thereby define a second bonus game triggering criterion different from the first bonus game triggering criterion;

selecting at the configuration workstation a second visual activity from the displayed list that is different from the first selected visual activity;

storing the second selections on the network; and operating one of the gaming machines in accordance with the stored second selections including:

detecting the second triggering criterion;

triggering the operation of a bonus game on a gaming machine to which the detected triggering criterion is related; and displaying the second selected visual activity on the bonus game display area of the gaming machine responsive to detecting the second selected triggering criterion.

13. A method for remotely configuring a gaming machine, having at least one payment acceptor, over a network from a configuration computer, the method comprising:

operating a bonus configuration program on a configuration computer remote from the gaming machine, the bonus configuration program including a rule generator comprising a plurality of lists including selectable bonus promotion criteria that are specific to a player playing the gaming machine, including:

a plurality of possible bonus game triggering criteria;

a plurality of possible visual activities for display on the gaming machine when the bonus game is triggered;

a plurality of possible award methods, wherein each of the plurality of award methods defines a method used to determine an item of value to be awarded; and a plurality of possible items of value awarded to a winner of the bonus game;

allowing one or more of the bonus promotion criteria to be selected by a network operator and causing the one or more selected criteria to be transmitted over the network to the gaming machine, the at least one payment acceptor receives physical media having a monetary value to establish a credit balance for a placement of one or more bets and to receive potential winnings resulting from one or more of the plurality of possible awards of a base game or bonus game.

14. The method of claim 13, further comprising:

receiving the one or more selected criteria at the gaming machine and configuring the gaming machine according to the selected criteria, wherein the selected bonus game triggering criteria are based at least partially on at least one selected outcome of the base game played on the gaming machine and selected using the bonus configuration program; and triggering the operation of a bonus game on a gaming machine being played by a player associated with the player data and to which the determined one or more selected criteria corresponds to.

15. The method of claim 13, wherein one of the selected criteria includes one or more defined triggering events, the method further including:

allowing play on the gaming machine; and triggering a bonus game on the gaming machine responsive to play on the gaming machine matching one of the defined triggering events.

16. The method of claim 13, further including:

identifying the player of the gaming machine;

triggering a bonus game on the gaming machine responsive to play by the identified player on the gaming machine according to the defined triggering events.

17. The method of claim 13, wherein the type of criteria to be selected within the configuration program includes at least two or more of the following types: machine selection, triggers, visual activity, award, and items of value.

18. The method of claim 13, wherein one of the selected criteria includes a plurality of defined triggering events, the method further including:

allowing play on the gaming machine; and triggering a bonus game on the gaming machine responsive to play on the gaming machine matching the defined triggering events.

19. An apparatus for an operator of networked gaming machines, each having at least one payment acceptor, to remotely configure a bonus game on at least one of the networked gaming machines, at least some of the gaming machines being of a type having a base game display area and a bonus game display area, said apparatus comprising:

a configuration workstation coupled to the gaming machines over the network, including:

a monitor for displaying a list of possible bonus game triggering criteria, a plurality of possible visual activities, and a plurality of award methods;

an input device configured to:

receive, from the operator, a selection of at least one of the plurality of possible bonus game triggering criteria to thereby define a bonus game triggering criterion related to at least one of the games;

receive a selection of at least one of the plurality of possible visual activities for presentation on the bonus game display area of the gaming machine being played by the player to which the triggering criterion is related; and receive a selection of one of the plurality of award methods;

memory storage accessible by the network for storing the selections, said configuration workstation configured to:

detect the selected triggering criterion;

trigger the operation of a bonus game on a gaming machine being played by a player associated with the player data and to which the determined possible bonus game triggering criteria corresponds to; and award an item of interest at the gaming machine based on the selected award method, the at least one payment acceptor receives physical media having a monetary value to establish a credit balance for a placement of one or more bets and to receive potential winnings resulting from one or more awards of a base game or bonus game.

20. The apparatus of claim 19 wherein the apparatus further comprises a player tracking system that identifies the player of the gaming machine on which the bonus game is operated and tracks the player's activity and wherein at least one of the bonus game triggering criteria relates to player's activity compiled over play of multiple games.

* * * * *